April 10, 1934.  H. E. PRUITT  1,954,747
NUT TAPPING MACHINE
Filed March 3, 1933   3 Sheets-Sheet 3
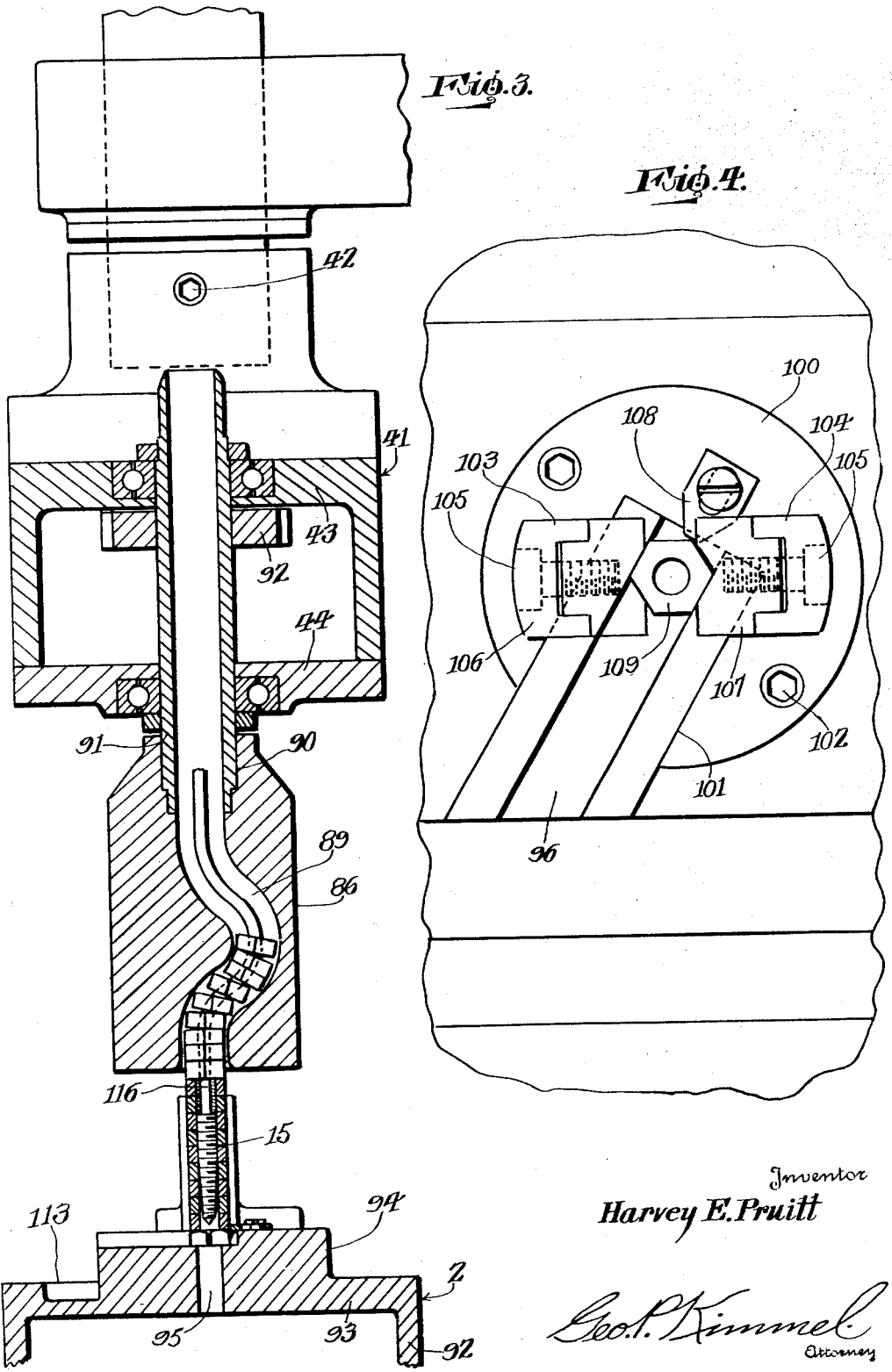
Inventor
Harvey E. Pruitt
Geo. F. Kimmel
Attorney Patented Apr. 10, 1934

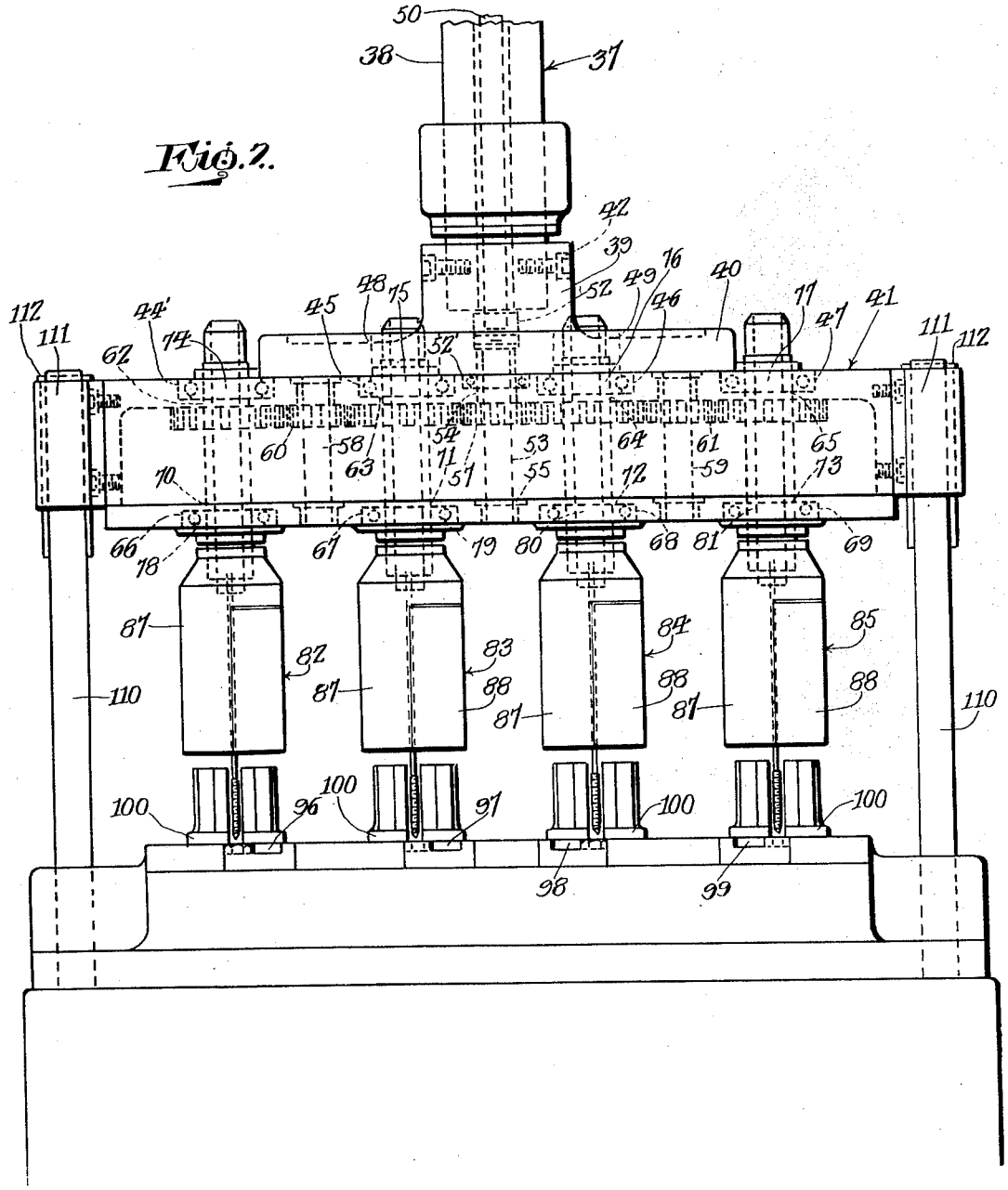

1,954,747

UNITED STATES PATENT OFFICE 1,954,747

NUT TAPPING MACHINE

Harvey E. Pruitt, Flint, Mich.

Application March 3, 1933, Serial No. 659,562

10 Claims. (Cl. 10—130)

This invention relates to a nut tapping machine, and has for its object to provide, in a manner as hereinafter set forth, a machine of the class referred to including a vertically movable driving mechanism for a set of chucks, each for operating a tapper element, and with the chucks and elements so constructed and so arranged relatively to each other, whereby they will coact to provide for the automatic discharge of the tapped nuts during the operation of the machine.

Further objects of the invention are to provide, in a manner as hereinafter set forth, a nut tapping machine which is comparatively simple in its construction and arrangement, strong, durable, compact, thoroughly efficient in its use, providing for an automatic discharge action for the tapped nuts, readily assembled, conveniently repaired when occasion requires, and comparatively inexpensive to manufacture.

To the above ends essentially, and to others which may hereinafter appear, the invention consists of such parts, and such combination of parts which fall within the scope of the invention as claimed.

In the drawings:

Figure 2 is a fragmentary view in front elevation.

Figure 3 is a fragmentary view in vertical section.

Figure 4 is a fragmentary view in top plan of the magazine for the blanks.

Figure 1:
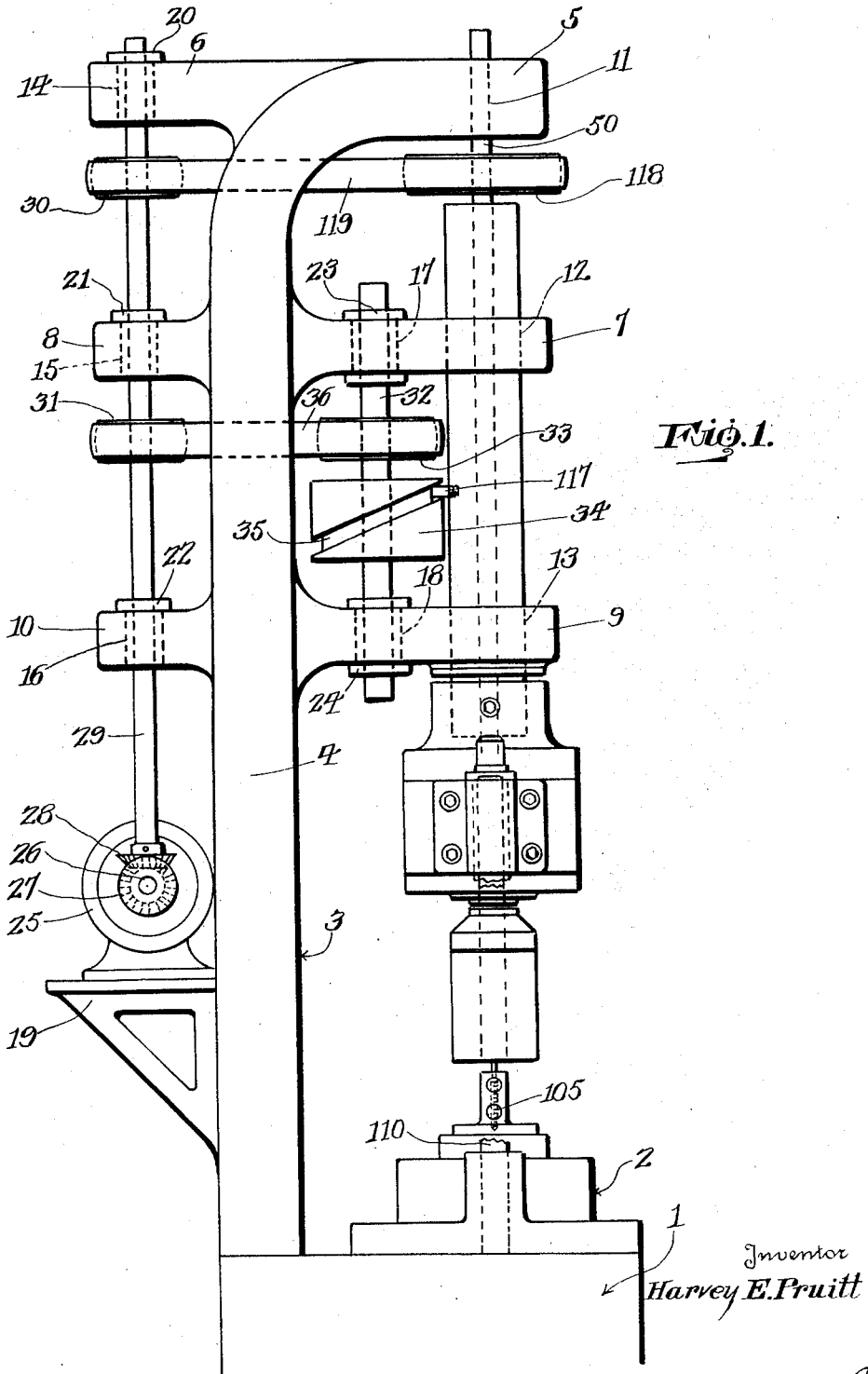
Figure 1 is a side elevation of the machine.

Referring to the drawings, 1 designates a base upon which is mounted a magazine 2 for the blanks which are to be tapped. Secured upon the top at the rear and centrally of base 1 is a superstructure 3 consisting of a vertically disposed standard 4 provided at its upper end with a forwardly and a rearwardly directed arm indicated at 5, 6 respectively. Below the arms 5, 6, standard 4 is formed with a forwardly and a rearwardly directed arm indicated at 7, 8 respectively arranged in parallel spaced relation with the arms 5, 6 respectively. Below the arms 7, 8 standard 4 is provided with a forwardly and a rearwardly directed arm indicated at 9, 10 respectively arranged in parallel spaced relation with the arms 7, 8 respectively. The arms 5, 7 and 9 have their free ends in vertical alignment and are formed with vertical openings 11, 12 and 13 respectively. The opening 11 is of less diameter than that of opening 12 or 13. The openings 12 and 13 are arranged in alignment and are of like diameter. The opening 11 is disposed in alignment with the axes of openings 12 and 13. The arms 6, 8 and 10 have their free ends in vertical alignment and are provided with vertical aligning openings 14, 15 and 16 respectively of like diameter. The arms 5, 7 and 9 are of greater length than arms 6, 8 and 10. The arms 7, 9 between the openings 12, 13 respectively and the standard 4 are formed with vertical aligning openings 17, 18 respectively of less diameter than openings 12, 13. Secured to the standard 4 below arm 10 is a support 19 arranged in parallel spaced relation with respect to such arm. Positioned in the openings 14, 15, 16, 17 and 18 are flanged bearing sleeves 20, 21, 22, 23 and 24 respectively. The arms 5, 7 and 9 overhang and are disposed in a direction to align with the transverse median of the magazine 2 but do not extend beyond the front of the latter.

Mounted on the support 19 is a motor 25 having its shaft 26 provided with a bevel gear 27 which meshes with and drives a bevel gear 28 on the lower end of the operating shaft 29 of the machine. The shaft 29 is vertically disposed and extends up through the bearing sleeves 22, 21 and 20. The shaft 29 below and in proximity to arm 6 carries a pulley 30 and below and in proximity to arm 8 carries a pulley 31. Extending through the bearing sleeves 23, 24 is a countershaft 32 provided with a pulley 33 below and in proximity to arm 7. The shaft 32 has fixed thereto in proximity to pulley 33 a circular cam element 34 formed in its periphery with a diagonally disposed endless groove 35. The shaft 32 is driven from shaft 29 by an endless belt 36 travelling around the pulleys 30 and 33.

The machine includes a vertically shiftable driving mechanism for simultaneously operating a set of chucks and with each chuck carrying and operating a tapper. The said mechanism is generally indicated at 37 and it includes a vertically disposed sleeve 38 shiftably mounted in the openings 12 and 13. The lower end of sleeve 38 is fixedly secured in a vertically disposed socketed extension 39 arranged centrally of and integral with a rectangular plate 40 which is connected with the top of a hollow rectangular carrier 41. Holdfast devices 42 are employed for anchoring the sleeve 38 to extension 39.

The top and bottom of carrier 41 are indicated at 43, 44 respectively. The top 43 is formed with spaced pockets corresponding in number to the number of chucks employed, and by way of example four pockets are shown and indicated at 44', 45, 46 and 47. The pockets 45, 46 register with openings 48, 49 respectively in plate 40.

Extending down through opening 11 and sleeve 38 is the drive shaft 50 of the driving mechanism 37. Plate 40 has an opening 51 which registers with an opening 52 in the bottom of extension 39 and also registers with a pocket 52' in the top 43 of carrier 41. The shaft 50 extends into opening 52 and is coupled to the upper end of a power transmitting shaft 53 which extends through opening 51 and pocket 52 and also through an opening 54 formed in the top 43. The shaft 53 at its lower end is journaled as at 55 in the bottom 44 of carrier 41. A bearing element 56 for shaft 53 is mounted in pocket 52. Shaft 53 in proximity to top 43 has fixed thereto a pinion 57. Journaled in the top and bottom of carrier 41 are power transmitting shafts 58, 59 positioned adjacent each side of shaft 53. The shafts 58, 59 in proximity to the top of the carrier are provided with pinions 60, 61 respectively. The top 43 of the carrier has openings 62, 63, 64 and 65 communicating respectively with pockets 44', 45, 46 and 47. The lower face of the bottom of the carrier is formed with downwardly opening pockets 66, 67, 68 and 69 communicating with openings 70, 71, 72 and 73 respectively. Within the pockets 44', 45, 46 and 47 are mounted bearing elements 74, 75, 76 and 77 respectively. The pockets 44', 45, 46 and 47 align with pockets 66, 67, 68 and 69 respectively. The openings 62, 63, 64 and 65 align with the openings 70, 71, 72 and 73 respectively. Within the pockets 66, 67, 68 and 69 are bearing elements 78, 79, 80 and 81 respectively.

The chucks are generally indicated at 82, 83, 84 and 85. The chuck 82 extends through bearing elements 74, 78; the chuck 83 through bearing elements 75, 79; the chuck 84 through bearing elements 76, 80 and the chuck 85 through bearing elements 77, 81. The chucks extend above and below the carrier, are bodily movable therewith and provided with conventional means to prevent the vertical movement thereof relative to the carrier.

Each chuck includes a head 86 formed of a pair of sections 87, 88 which are detachably connected together. The head 86 is formed with a passage 89 having an intermediate portion which is offset with respect to the end portions thereof, the latter being arranged at the axis of the head. A socket 90 is arranged in the upper portion of the head and which opens into the upper end portion of the passage. Extending into socket 90 and fixed to head 86 is a vertically disposed rotatable tubular stem 91 provided with a gear 92 which meshes with and is driven by a pinion on a power transmitting shaft. The stem 91 is open at each end and forms a continuation of passage 89. The stems of chucks 82 and 85 extend above the top of the carrier. The stems of chucks 83, 84 extend above the upper face of plate 40. The stems of the chucks are mounted in the carrier, depend below the latter and suspend the heads 86. The upper ends of the stems provide discharge outlets for the tapped nuts. The stems and passage form conduits for the travel of the tapped nuts to points of discharge.

The magazine 2 comprises a hollow body portion 92 formed with a top 93 provided with an upstanding enlargement 94. The top of magazine 2 is formed with parallel aligning openings 95 corresponding in number to the number of the chucks. The enlargement 94 is formed with diagonally disposed feed passages 96, 97, 98 and 99 corresponding in number to the number of openings 95. An opening 95 is arranged in close proximity to the inner end of a feed passage. The work, such as castillated nuts are fed in rows to be acted upon at the inner end of a feed passage. The openings 95 communicate with the interior of body portion 92 for discharging the cuttings in the latter. Mounted upon the enlargement 94 is a series of spaced plates 100 each having a diagonally disposed cutout 101 arranged over a feed passage and forming a clearance for the upward movement of a tapped nut. The plates 100 correspond in number to the number of feed passages and are secured to enlargement 94 by the holdfast devices 102. Integral with each plate 100 is a pair of oppositely disposed, parallel, spaced channel-shaped supports 103, 104 for adjusting screws 105 threadedly engaging in a pair of oppositely disposed, vertically extending, horizontally adjustable guide members 106, 107 formed with V-shaped working faces. Secured upon each plate 100 and overhanging the inner end of a feed passage is an adjustable stop 108 for the work, the latter as shown being a castillated nut 109 and which when positioned to be tapped registers with an opening 95.

Each end of the magazine 2 has secured thereto a vertically disposed guide rod 110 which passes through a tubular guide 111. The guides 111 are secured to the ends of the carrier 41. The rods 110 carry at their upper ends stops 112. Magazine 2 has a storage cavity 113 for the nuts which are to be tapped.

Each tapper is generally indicated at 114 and includes a tap 115 and a shank 116 which corresponds in shape to that of a passage 89, but the end portions of the shank are of greater length than the end portions of the passage. The shank extends up into a stem 91 and depends below a head 86.

When a nut has been tapped it passes upwardly on the tap 115 and from off the latter onto the shank 116. The lower tapped nuts force the upper tapped nuts along the shanks 116 and through passages 89 to points of discharge. The shape of shanks 116 cause them to bodily rotate with the chucks. The nuts when on the shanks tend to centrally arrange the taps with respect to the chucks.

The sleeve 38 has a peripheral pin or lug 117 which travels in the groove 35 of cam 34 whereby there is imparted to the mechanism 37 successively an upward and downward movement, such latter movement causing the tapping of the nut by the tap, as the latter is bodily carried with a chuck. The upward movement of mechanism 37 moves the tap upwardly to enable the shifting in position of another castillated nut to be tapped.

The chucks are simultaneously operated from the pinions on the power transmitting shafts. The elements 32, 33, 34 and 117 provide an elevating and lowering mechanism for the chuck driving mechanism.

The shaft 50 carries a pulley 118 which is driven from pulley 30 by an endless belt 119.

The elements 25, 26, 27, 28, 29, 31, 36, 30 and 119 provide an operating mechanism for and which is common to the elevating and lowering mechanism and the chuck driving mechanism, the latter being operated in the same direction when it moves upwardly and downwardly.

Each tap is threaded from end to end and its upper end is of greater diameter than that of the stem to which it is connected.

What I claim is:—

1. In a nut tapping machine, a vertically movable sleeve, a horizontally disposed hollow rectangular carrier secured centrally of its top to the lower end of the sleeve and bodily moving with the latter, a vertically disposed rotatable driven element arranged within the sleeve and within the carrier and having its upper end positioned above the top of the sleeve, a prime mover, operable means engaging in the outer periphery of the sleeve for alternately elevating and lowering it, an operating drive connection for and leading from said prime mover to the upper end of said element, an operating drive connection for and leading from said prime mover to said means, said drive connections being operated simultaneously from said prime mover, a series of rotatable chuck devices anchored to, passing through and depending from the carrier, said devices extending above the carrier adjacent opposite sides of said sleeve and each provided with a gear arranged within the carrier, rotatable pinions within the carrier and meshing with said gears, means meshing with a pair of said gears and operated from said element for simultaneously rotating said pinions and gears for simultaneously rotating said devices, each of said devices being formed with a conduit opening at the ends thereof for the passage of tapped nuts to discharge onto the top of the carrier, taps, a stem extended from each tap into a conduit from the lower end of the latter, said stems being bodily rotatable with said devices and each constituting a guide for nuts acted upon by a tap, and a supporting structure positioned below the taps and formed with spaced means for holding a plurality of nuts stationary in a horizontal row to be tapped simultaneously.

2. In a nut tapping machine, a vertically movable sleeve, a horizontally disposed hollow rectangular carrier secured centrally of its top to the lower end of the sleeve and bodily moving with the latter, a vertically disposed rotatable driven element arranged within the sleeve and within the carrier and having its upper end positioned above the top of the sleeve, a prime mover, operable means engaging in the outer periphery of the sleeve for alternately elevating and lowering it, an operating drive connection for and leading from said prime mover to the upper end of said element, an operating drive connection for and leading from said prime mover to said means, said drive connections being operated simultaneously from said prime mover, a series of rotatable chuck devices anchored to, passing through and depending from the carrier, said devices extending above the carrier adjacent opposite sides of said sleeve and each provided with a gear arranged within the carrier, rotatable pinions within the carrier and meshing with said gears, means meshing with a pair of said gears and operated from said element for simultaneously rotating said pinions and gears for simultaneously rotating said devices, each of said devices being formed with a conduit opening at the ends thereof for the passage of tapped nuts to discharge onto the top of the carrier, taps, a stem extended from each tap into a conduit from the lower end of the latter, said stems being bodily rotatable with said devices and each constituting a guide for nuts acted upon by a tap, a supporting structure positioned below the taps and formed with spaced means for holding a plurality of nuts stationary in a horizontal row to be tapped simultaneously, and means extending upwardly from said structure and passing through the ends of the carrier to provide guides for the latter.

3. In a nut tapping machine, a vertically movable sleeve, a horizontally disposed hollow rectangular carrier secured centrally of its top to the lower end of the sleeve and bodily moving with the latter, a vertically disposed rotatable driven element arranged within the sleeve and within the carrier and having its upper end positioned above the top of the sleeve, a prime mover, operable means engaging in the outer periphery of the sleeve for alternately elevating and lowering it, an operating drive connection for and leading from said prime mover to the upper end of said element, an operating drive connection for and leading from said prime mover to said means, said drive connections being operated simultaneously from said prime mover, a series of rotatable chuck devices anchored to, passing through and depending from the carrier, said devices extending above the carrier adjacent opposite sides of said sleeve and each provided with a gear arranged within the carrier, rotatable pinions within the carrier and meshing with said gears, means meshing with a pair of said gears and operated from said element for simultaneously rotating said pinions and gears for simultaneously rotating said devices, each of said devices being formed with a conduit opening at the ends thereof for the passage of tapped nuts to discharge onto the top of the carrier, taps, a stem extended from each tap into a conduit from the lower end of the latter, said stems being bodily rotatable with said devices and each constituting a guide for nuts acted upon by a tap, a supporting structure positioned below the taps and formed with spaced means for holding a plurality of nuts stationary in a horizontal row to be tapped simultaneously, and a tap nut guide encompassing each tap in spaced relation and anchored to said structure.

4. In a nut tapping machine, a vertically movable sleeve, a horizontally disposed hollow rectangular carrier secured centrally of its top to the lower end of the sleeve and bodily moving with the latter, a vertically disposed rotatable driven element arranged within the sleeve and within the carrier and having its upper end positioned above the top of the sleeve, a prime mover, operable means engaging in the outer periphery of the sleeve for alternately elevating and lowering it, an operating drive connection for and leading from said prime mover to the upper end of said element, an operating drive connection for and leading from said prime mover to said means, said drive connections being operated simultaneously from said prime mover, a series of rotatable chuck devices anchored to, passing through and depending from the carrier, said devices extending above the carrier adjacent opposite sides of said sleeve and each provided with a gear arranged within the carrier, rotatable pinions within the carrier and meshing with said gears, means meshing with a pair of said gears and operated from said element for simultaneously rotating said pinions and gears for simultaneously rotating said devices, each of said devices being formed with a conduit opening at the ends thereof for the passage of tapped nuts to discharge onto the top of the carrier, taps, a stem extended from each tap into a conduit from the lower end of the latter, said stems being bodily rotatable with said devices and each constituting a guide for nuts acted upon by a tap, a supporting structure positioned below the taps and formed with spaced means for holding a plurality of nuts stationary in a horizontal row to be tapped simultaneously, means extending upwardly from said structure and passing through the ends of the carrier to provide guides for the latter, and a tap nut guide encompassing each tap in spaced relation and anchored to said structure.

5. In a nut tapping machine, a vertically movable sleeve, a horizontally disposed hollow rectangular carrier secured centrally of its top to the lower end of the sleeve and bodily moving with the latter, a vertically disposed rotatable driven element arranged within the sleeve and within the carrier and having its upper end positioned above the top of the sleeve, a prime mover, operable means engaging in the outer periphery of the sleeve for alternately elevating and lowering it, an operating drive connection for and leading from said prime mover to the upper end of said element, an operating drive connection for and leading from said prime mover to said means, said drive connections being operated simultaneously from said prime mover, a series of rotatable chuck devices anchored to, passing through and depending from the carrier, said devices extending above the carrier adjacent opposite sides of said sleeve and each provided with a gear arranged within the carrier, rotatable pinions within the carrier and meshing with said gears, means meshing with a pair of said gears and operated from said element for simultaneously rotating said pinions and gears for simultaneously rotating said devices, each of said devices being formed with a conduit opening at the ends thereof for the passage of tapped nuts to discharge onto the top of the carrier, taps, a stem extended from each tap into a conduit from the lower end of the latter, said stems being bodily rotatable with said devices and each constituting a guide for nuts acted upon by a tap, a supporting structure positioned below the taps and formed with spaced means for holding a plurality of nuts stationary in a horizontal row to be tapped simultaneously, a support common to said prime mover and operable means, and said support being formed with guiding means for said element and sleeve.

6. In a nut tapping machine, a vertically movable sleeve, a horizontally disposed hollow rectangular carrier secured centrally of its top to the lower end of the sleeve and bodily moving with the latter, a vertically disposed rotatable driven element arranged within the sleeve and within the carrier and having its upper end positioned above the top of the sleeve, a prime mover, operable means engaging in the outer periphery of the sleeve for alternately elevating and lowering it, an operating drive connection for and leading from said prime mover to the upper end of said element, an operating drive connection for and leading from said prime mover to said means, said drive connections being operated simultaneously from said prime mover, a series of rotatable chuck devices anchored to, passing through and depending from the carrier, said devices extending above the carrier adjacent opposite sides of said sleeve and each provided with a gear arranged within the carrier, rotatable pinions within the carrier and meshing with said gears, means meshing with a pair of said gears and operated from said element for simultaneously rotating said pinions and gears for simultaneously rotating said devices, each of said devices being formed with a conduit opening at the ends thereof for the passage of tapped nuts to discharge onto the top of the carrier, taps, a stem extended from each tap into a conduit from the lower end of the latter, said stems being bodily rotatable with said devices and each constituting a guide for nuts acted upon by a tap, a supporting structure positioned below the taps and formed with spaced means for holding a plurality of nuts stationary in a horizontal row to be tapped simultaneously, means extending upwardly from said structure and passing through the ends of the carrier to provide guides for the latter, a support common to said prime mover and operable means, and said support being formed with guiding means for said element and sleeve.

7. In a nut tapping machine, a vertically movable hollow rectangular carrier, a series of spaced parallel vertically disposed tubular rotatable shafts extending through and above and below the carrier, said shafts providing discharge passages for the tapped nuts, superposed spaced combined bearing and retaining means exteriorly of the top and bottom of said carrier for each shaft, a horizontally disposed gear train within the carrier, connected with said shafts for simultaneously operating the latter and including a central driving gear therefor, a rotatable element coupled to the carrier for operating said central gear, a sectional chuck connected to the lower end of and depending from each shaft and formed with a conduit open at each end and communicating intermediate its ends with a discharge passage, and combined nut tapping and tapped nut guiding means bodily moving with the chucks and having the upper portion thereof extending into said conduits.

8. In a nut tapping machine, a vertically movable hollow rectangular carrier, a series of spaced parallel vertically disposed tubular rotatable shafts extending through and above and below the carrier, said shafts providing discharge passages for the tapped nuts, superposed spaced combined bearing and retaining means exteriorly of the top and bottom of said carrier for each shaft, a horizontally disposed gear train within the carrier, connected with said shafts for simultaneously operating the latter and including a central driving gear therefor, a rotatable element coupled to the carrier for operating said central gear, a sectional chuck connected to the lower end of and depending from each shaft and formed with a conduit open at each end and communicating intermediate its ends with a discharge passage, combined nut tapping and tapped nut guiding means bodily moving with the chucks and having the upper portion thereof extending into said conduits, and a supporting structure arranged below the carrier and having spaced means for holding a plurality of nuts in a horizontal row to be tapped simultaneously.

9. In a nut tapping machine, a vertically movable hollow rectangular carrier, a series of spaced parallel vertically disposed tubular rotatable shafts extending through and above and below the carrier, said shafts providing discharge passages for the tapped nuts, superposed spaced combined bearing and retaining means exteriorly of the top and bottom of said carrier for each shaft, a horizontally disposed gear train within the carrier, connected with said shafts for simultaneously operating the latter and including a central driving gear therefor, a rotatable element coupled to the carrier for operating said central gear, a sectional chuck connected to the lower end of and depending from each shaft and formed with a conduit open at each end and communicating intermediate its ends with a discharge passage, combined nut tapping and tapped nut guiding means bodily moving with the chucks and having the upper portion thereof extending into said conduits, and spaced parallel means extending upwardly from said structure and passing through the ends of the carrier to provide guides for the latter.

10. In a nut tapping machine, a vertically movable hollow rectangular carrier, a series of spaced parallel vertically disposed tubular rotatable shafts extending through and above and below the carrier, said shafts providing discharge passages for the tapped nuts, superposed spaced combined bearing and retaining means exteriorly of the top and bottom of said carrier for each shaft, a horizontally disposed gear train within the carrier, combined with said shafts for simultaneously operating the latter and including a central driving gear therefor, a rotatable element coupled to the carrier for operating said central gear, a sectional chuck connected to the lower end of and depending from each shaft and formed with a conduit open at each end and communicating intermediate its ends with a discharge passage, combined nut tapping and tapped nut guiding means bodily moving with the chucks and having the upper portion thereof extending into said conduits, a supporting structure arranged below the carrier and having spaced means for holding a plurality of nuts in a horizontal row to be tapped simultaneously, and a tap nut guide encompassing in spaced relation the lower portion of each combined nut tapping and guiding means and anchored to said structure.

HARVEY E. PRUITT.